(12) United States Patent
Kontkanen

(10) Patent No.: US 9,275,493 B2
(45) Date of Patent: Mar. 1, 2016

(54) RENDERING VECTOR MAPS IN A GEOGRAPHIC INFORMATION SYSTEM

(71) Applicant: Google Inc., Mountain View, CA (US)

(72) Inventor: Janne Kontkanen, San Francisco, CA (US)

(73) Assignee: Google Inc., Mountain View, CA (US)

( * ) Notice: Subject to any disclaimer, the term of this patent is extended or adjusted under 35 U.S.C. 154(b) by 156 days.

(21) Appl. No.: 14/100,346

(22) Filed: Dec. 9, 2013

(65) Prior Publication Data

US 2015/0178977 A1    Jun. 25, 2015

Related U.S. Application Data

(60) Provisional application No. 61/823,250, filed on May 14, 2013.

(51) Int. Cl.
- *G06T 15/04* (2011.01)
- *G06T 15/50* (2011.01)
- *G06T 17/05* (2011.01)

(52) U.S. Cl.
CPC ............... *G06T 15/04* (2013.01); *G06T 15/503* (2013.01); *G06T 17/05* (2013.01)

(58) Field of Classification Search
CPC ....... G06T 15/04; G06T 15/205; G06T 17/05; G06T 15/503; G06F 17/30241; G06F 17/30256; G06F 17/30247
See application file for complete search history.

(56) References Cited

U.S. PATENT DOCUMENTS

2013/0321443 A1* 12/2013 Pahwa et al. .................. 345/587

OTHER PUBLICATIONS

Kersting et al., Interactive 3D Visualization of Vector Data in GIS, GIS'02, Nov. 8-9, 2002, McLean, Virginia, USA, pp. 107-112.*
Döllner et al., Texturing Techniques for Terrain Visualization, VIS '00 Proceedings of the conference on Visualization '00 pp. 227-234.*

* cited by examiner

*Primary Examiner* — Haixia Du
(74) *Attorney, Agent, or Firm* — Dority & Manning, P.A.

(57) ABSTRACT

Systems and methods for rendering vector data in conjunction with a three-dimensional model are provided. An initial vector map providing a two dimensional representation of vector data, including one or more vector elements (roads, road names, borders, transit lines, etc.), can be texture mapped so that it appears to be located on a surface of the three-dimensional polygon mesh. The initial vector map can be updated or adjusted to an updated vector map. According to aspects of the present disclosure, a blended vector map can be rendered during a blend period to provide for a transition to the updated vector map. The transition can include fading in of vector elements in the updated vector map and/or fading out of vector elements in the initial vector map.

12 Claims, 5 Drawing Sheets

RENDERING VECTOR MAPS IN A GEOGRAPHIC INFORMATION SYSTEM

PRIORITY CLAIM

The present application claims the benefit of priority of U.S. Provisional Patent Application Ser. No. 61/823,250, titled Level of Detail Management in Geographic Information System, filed May 14, 2013, which is incorporated by reference herein.

FIELD

The present disclosure relates generally to computer graphics and more particularly, to rendering vector data in conjunction with three-dimensional objects in a computer graphics application.

BACKGROUND

Improvements in computer processing power and broadband technology have led to the development of interactive three-dimensional models. For instance, interactive geographic information systems can provide for the navigating and displaying of three-dimensional representations of geographic areas. A user can navigate the three-dimensional representation by controlling a virtual camera that specifies what portion of the three-dimensional representation is rendered and presented to a user.

The three-dimensional model can include geometry and texture that is texture mapped to the geometry. For instance, a three dimensional model of a geographic area can include a three-dimensional polygon mesh that models the terrain in addition to buildings, bridges, and other objects. Geographic imagery, such as aerial or satellite imagery, and other imagery can be texture mapped to the three-dimensional mesh to provide a more realistic model of the geographic area.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of rendering vector data in conjunction with a three-dimensional representation of a geographic area. The method includes rendering, by one or more computing devices, a first vector map in conjunction with a three-dimensional model. The first vector map is texture mapped to the three-dimensional model. The first vector map can include one or more vector elements. The method further includes obtaining, by the one or more computing devices, a second vector map including one or vector elements that are different from the one or more cartographic elements in the first vector map. The method further includes rendering, by the one or more computing devices, a blended vector map in conjunction with the three-dimensional model during a blending period to transition to the second vector map.

Other example aspects of the present disclosure are directed to systems, apparatus, non-transitory computer-readable media, user interfaces and devices for rendering vector data in conjunction with a three-dimensional model of a geographic area.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
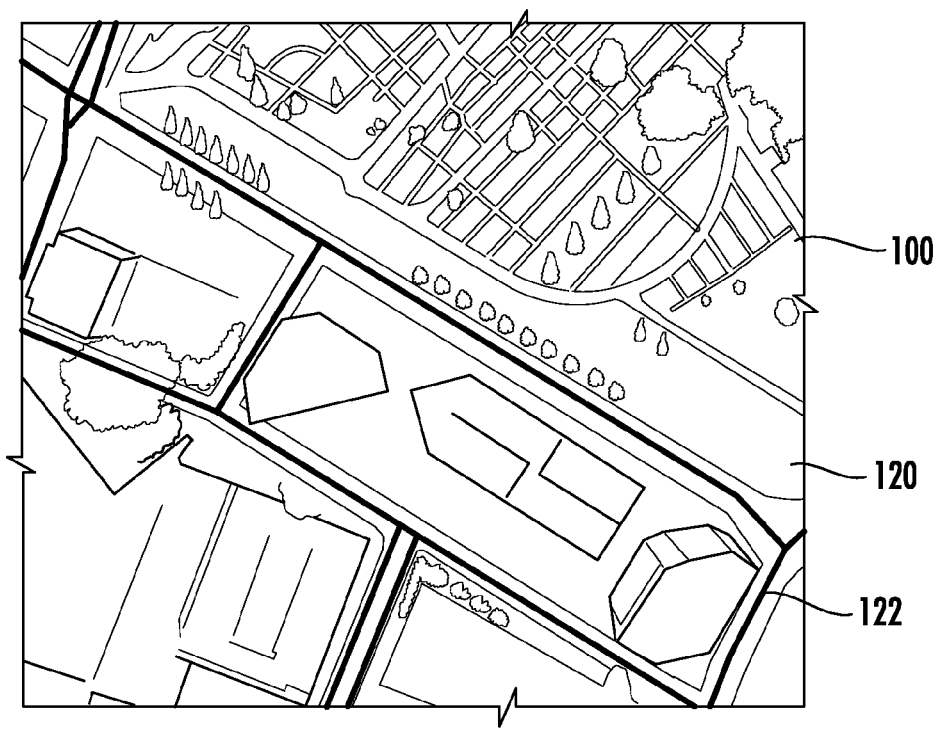
FIG. 1 depicts an example vector map rendered in conjunction with a three-dimensional model.

Reference now will be made in detail to embodiments, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Overview

Generally, example aspects of the present disclosure are directed to systems and methods for rendering vector data in conjunction with a three-dimensional model. Vector data can be rendered in conjunction with the three dimensional model. Vector data can include data such as geometric shapes, labels, overlays, text, and other data. Certain types of vector data are preferably rendered such that the vector data appears on the surface of the three-dimensional model. For instance, cartographic elements such as roads, road names, borders, transit lines, and other cartographic elements, can be rendered so as to appear on the surface of the three-dimensional polygon mesh representing the terrain of a geographic area.

Vector data can be rendered such that it appears on the surface of a three-dimensional model by texture mapping the vector data to a surface of the three-dimensional model. For instance, vector elements (e.g. cartographic elements such as roads, road names, borders, transit lines, and other cartographic elements), can be rendered using texture mapping so as to appear on the surface of a three-dimensional polygon mesh representing the buildings and terrain of the geographic area. Texture mapping can involve mapping two-dimensional vector data in a vector space to various points on the surface of the three-dimensional model.

Vector data rendered in conjunction with a three-dimensional model can be updated in a variety of circumstances. As one example, new vector data can be fetched from a remote computing device. As another example, the display of vector data in conjunction with a three-dimensional model in a graphics application can be view dependent. For instance, a user can adjust the view of a representation of a geographic area provided by a geographic information system by navigating a virtual camera. The virtual camera can define the perspective from which a three-dimensional model is displayed. Different vector data can be displayed when the three-dimensional model is viewed from different virtual camera viewpoints. For instance, vector elements can be added or removed from the representation depending on the view of the three-dimensional model. The addition or removal of vector elements during the rendering of new vector data can lead to a distracting visual pop which can disrupt the experience of the user.

According to example aspects of the present disclosure, a smooth transition to the updated vector data can be provided by fading in the updated vector data and fading out the previously displayed vector data. More particularly, an initial vector map providing a two dimensional representation of vector data, including one or more vector elements (e.g. roads, road names, borders, transit lines, etc.), can be texture mapped so that the vector elements appear to be located on a surface of a three-dimensional model. The initial vector map can be updated or adjusted to an updated vector map, for instance, as a result of navigation of a virtual camera or as a result of fetching new vector elements from a remote computing device. During the transition between the initial vector map and the updated vector map, a blended vector map can be rendered in conjunction with the three-dimensional model. The blended vector map can comprise a blend (e.g. an alpha blend) between the updated vector map and a vector map previously rendered or displayed in a previous rendering frame (e.g. the immediately preceding rendering frame). The blended vector map can converge to the updated vector map over a plurality of rendering frames rendered over the course of a blending period.

In cases where the updated vector map results from navigation to a new view of the three-dimensional model, for instance, as a result of navigation of a virtual camera. The updated vector map can be rendered from a new viewpoint relative to the initial vector map. As a result, an initial vector map rendered during the transition can contain elements that are not aligned with the updated vector map. For instance, the same vector representation of a road can project to different locations in the initial vector map and the updated vector map. To address this, the initial vector map can be reprojected such that the vector elements are aligned.

In one example embodiment of the present disclosure, a three-dimensional representation of a geographic area can be provided for display on a display device by a geographic information system. The three-dimensional representation of the geographic area can include a three-dimensional model (e.g. a polygon mesh), texture data mapped to the surface of the three-dimensional model (e.g. aerial or satellite imagery), and vector data rendered in conjunction with the three-dimensional model. Cartographic vector elements (e.g. roads, roads, road names, borders, transit lines, and other cartographic vector elements) can be textured mapped to the surface of the three-dimensional model so that the cartographic vector elements appear to be located on the surface of the three-dimensional model.

A user can navigate a virtual camera to view the three-dimensional representation of the geographic area from a different view perspective. For instance, the user can rotate, pan, tilt, or otherwise navigate the virtual camera to view the three-dimensional representation from a different perspective. The navigation of the virtual camera can result in the display of new vector elements. The new vector elements can be faded in over time by rendering a blended vector map that blends an updated vector map containing the new vector elements against a vector map rendered in a previous rendering frame. The vector map rendered in the previous rendering frame can be reprojected such that vector elements of the vector map are aligned with vector elements in the updated vector map. In this manner, example aspects of the present disclosure can provide for the smooth transition of vector elements as they appear in the representation of the geographic area and disappear from the representation of the geographic area.

Example Rendering of Vector Data

FIG. 1 depicts an example three-dimensional representation 100 of a geographic area. The three-dimensional representation 100 can be presented in a user interface of a geographic information system. Vector data 120 can be rendered in conjunction with the three-dimensional representation 100 of the geographic area. The vector data 120 can include a plurality of vector elements, such as road vector elements 122. While the present disclosure will be discussed with reference to road vector elements for purposes of illustration and discussion, those of ordinary skill in the art, using the disclosures provided herein, will understand that other vector elements, such as borders, transit lines, etc., can be rendered according to example aspects of the present disclosure.

Figure 2:
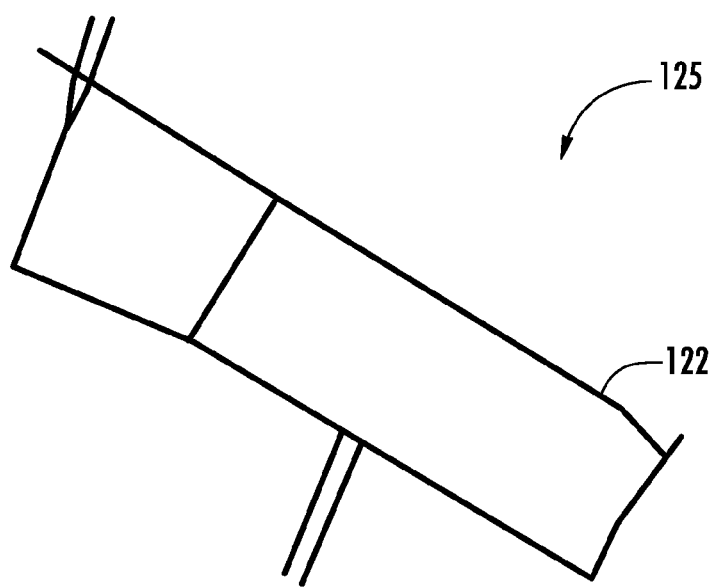
FIG. 2 depicts an example initial vector map according to an example aspect of the present disclosure.

The vector data 120 can be rendered by texture mapping a two-dimensional vector map to the surface of the three-dimensional model of the geographic area. FIG. 2 depicts an example two-dimensional vector map 125 that is rendered in conjunction with a three-dimensional representation 100 (FIG. 1) of the geographic area. The vector map 125 provides a two-dimensional representation of the vector data 120, including road vector elements 122. The vector map 125 can be rendered by a two-dimensional rendering system that can render the flat two-dimensional vector map 125. The vector map 125 can define a two-dimensional texture space that includes a plurality of texels. A texel of the vector map 125 represents the smallest graphical element of the vector map 125 in the two-dimensional texture space. The view used to render the vector map 125 can loosely follow the primary camera viewpoint that is used to render the three-dimensional representation 100.

Referring back to FIG. 1, the vector map 125 can be rendered in conjunction with the three-dimensional representation 100 of the geographic area. For instance, a three-dimensional rendering system can render a three-dimensional polygon mesh modeling the terrain and buildings of the geographic area. Geographic imagery, such as satellite imagery, aerial imagery, or other imagery can be texture mapped to the polygon mesh. In addition, the three-dimensional rendering system can render the vector map 125 as a texture to add road vector elements 122 to the three-dimensional representation 100. More particularly, a texture map can associate each texel of the vector map 125 with a point on the three-dimensional model. The three-dimensional renderer can then map each point on the three-dimensional model to one or more pixels for display to a user. In this way, the texture map can allow for the road vector elements 122 of the vector map 125 to be rendered at the right locations in the three-dimensional representation 100 of the geographic area.

Rendering the vector map 125 can be computationally expensive. As a result, it may not be necessary to re-render the vector map 125 each time the renderer renders a new rendering frame. Instead the same vector map 125 can be used across multiple rendering frames to provide a performance benefit. The ability to reuse vector map 125 across multiple rendering frames can be a consequence of having the capability to map from the vector map 125 correctly even if it has been generated from a camera that is not entirely aligned with the primary camera.

Periodically, the vector map 125 can be updated to an updated vector map to add or remove vector elements from the vector map 125. For example, new vector elements can become available as they are fetched from a remote computing device such as a server. In this case, the new vector elements can be added to the vector map. As another example, the vector map 125 can be updated when a user navigates a virtual camera (e.g. zooming, panning, tilting, etc.) to obtain a different camera view of the three-dimensional representation 100 of the geographic area. When the vector map 125 is updated to an updated vector map as a result of virtual camera navigation, new vector elements may appear and old vector elements may disappear.

Figure 3:
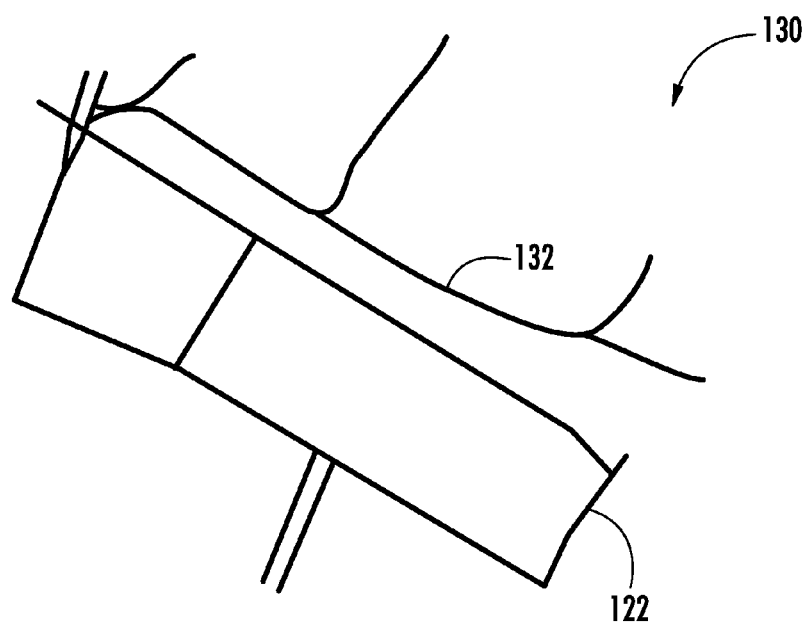
FIG. 3 depicts an example updated vector map according to an example embodiment of the present disclosure.

For example, FIG. 3 depicts an updated vector map 130 that includes new road vector elements 132 in addition to the previously drawn road elements 122. The new road elements 132 can have become available as a result of the new road elements 132 being fetched from a server.

According to aspects of the present disclosure, a transition can be provided between the initial vector map 125 and the updated vector map 130 to reduce popping of vector data in and out of view. More particularly, the transition can provide for the smooth fading in of new vector elements into the updated vector map and the smooth fading out of old vector elements from the updated vector map. This smooth transition can achieved, for instance by blending the updated vector map 130 for a blending period over a plurality of rendering frames. The blending can be performed over a specified number of rendering frames or for a predetermined time interval after the vector map 125 is updated to the updated vector map 130. The blend can be an alpha blend such that the transparency of the updated vector map 130 transitions from more transparent to less transparent (i.e. more opaque).

In one particular implementation, the blending can be performed by rendering a blended vector map in conjunction with the geographic imagery. The blended vector map can provide a blend between the updated vector map and the vector map rendered in a previous rendering frame (e.g. the initial vector map). As used herein, the previous rendering frame can include the immediately preceding rendering frame. The blend can be an alpha blend that specifies the transparencies of the updated vector map and the vector map rendered in the previous frame. For instance, the blended vector map $T2_{Current\ Frame}$ for each rendering frame can be determined as follows:

$$T2_{Current\ Frame} = alpha * T1_{Updated} + (1-alpha) * T2_{Previous\ Frame}$$

$T2_{Current\ Frame}$ is the blended vector map for the rendering frame and is the vector map that is actually rendered by the three dimensional rendering system on the surface of the mesh. $T1_{Updated}$ is the updated vector map. $T2_{Previous\ Frame}$ is the blended vector map T2 for the previous rendering frame. $T2_{Previous\ Frame}$ can be initialized as the initial vector map. $T2_{Previous\ Frame}$ and $T2_{Current\ Frame}$ are not stored separately, but rather refer to the blended texture map T2 for different moments in time.

Alpha controls the transparency of $T1_{Updated}$ and $T2_{Previous\ Frame}$ in the determination of the blended vector map for the current frame. Alpha values closer to 0 provide for increased transparency while alpha values closer to 1 provide for decreased transparency (i.e. increased opacity). Alpha can be selected such that the blended vector map converges visually close to the updated vector map at the close of a blend duration or blending period (e.g. after a specified number of rendering frames N or after a predetermined time interval). For instance, in one implementation, the alpha can be about 0.1 to provide a smooth transition across 20 rendering frames. At the end of the blending period, the blended vector map can be overwritten by the updated vector map.

This blending technique has the effect that the rendered blended vector map smoothly follows the contents of the updated vector map. Whenever a new vector element appears in the updated vector map, the new vector can smoothly fade into the blended vector map. Whenever a vector element disappears from the vector map, the vector element can smoothly fade out of the blended vector map.

Figure 4:
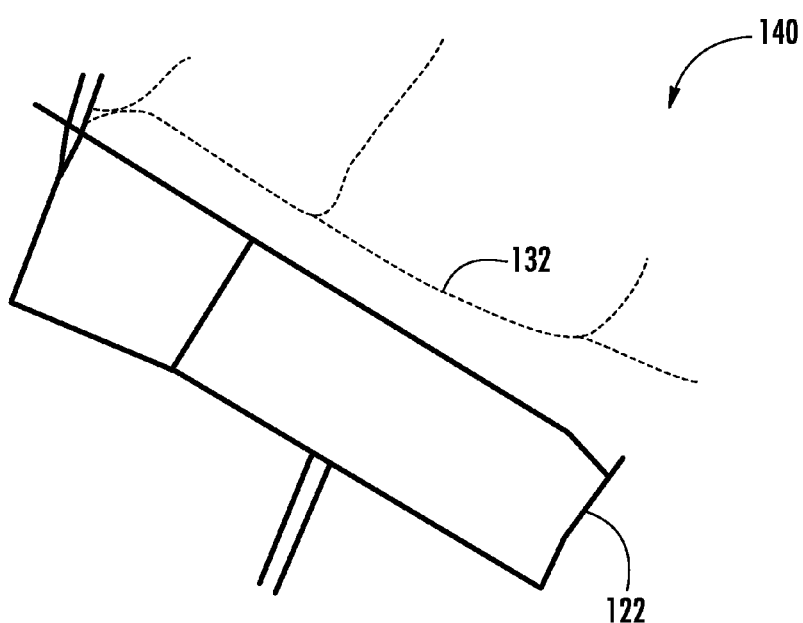
FIG. 4 depicts an example blended texture map according to an example embodiment of the present disclosure.

For instance, FIG. 4 depicts an example blended vector map 140 that can be rendered during a blend period according to an example embodiment of the present disclosure. As shown, the blended vector map includes a blend of road vector elements 122 rendered in a previous rendering frame (e.g. initial vector map 120) as well as road vector elements 132 in the updated vector map (e.g. updated vector map 130). The road vector elements 132 are more transparent relative to the road vector elements 120 as a result of the alpha blend. As the blended vector map 140 is updated across rendering frames, the road vector elements 132 will gradually become less and less transparent until the blended vector map 140 converges closely with the updated vector map 130.

The above blending technique works well for vector map updates that do not involve virtual camera motion. However, as discussed above, a vector map can often be updated as a result of virtual camera motion. When the virtual camera changes, the updated vector map is rendered from a new viewpoint. As a result, the blended vector map can contain vector elements that are not aligned with the updated vector map. For instance, a road vector element can project to different locations in the different vector map.

To address this, a vector map rendered in a previous rendering frame used to generate the blended texture (e.g. the initial vector map) can be reprojected such that vector elements are aligned after a virtual camera update. This reprojection can be implemented by mapping coordinates in the texture space associated with the previous vector map to the texture space associated with the updated vector map. This allows for texture coordinates associated with the previous vector map to be reprojected into the texture space defined by the updated vector map. A blended vector map can then be rendered as set forth above. An example method for reprojecting a vector map will be discussed with reference to FIG. 6 below.

Example Methods for Rendering Vector Data

Figure 5:
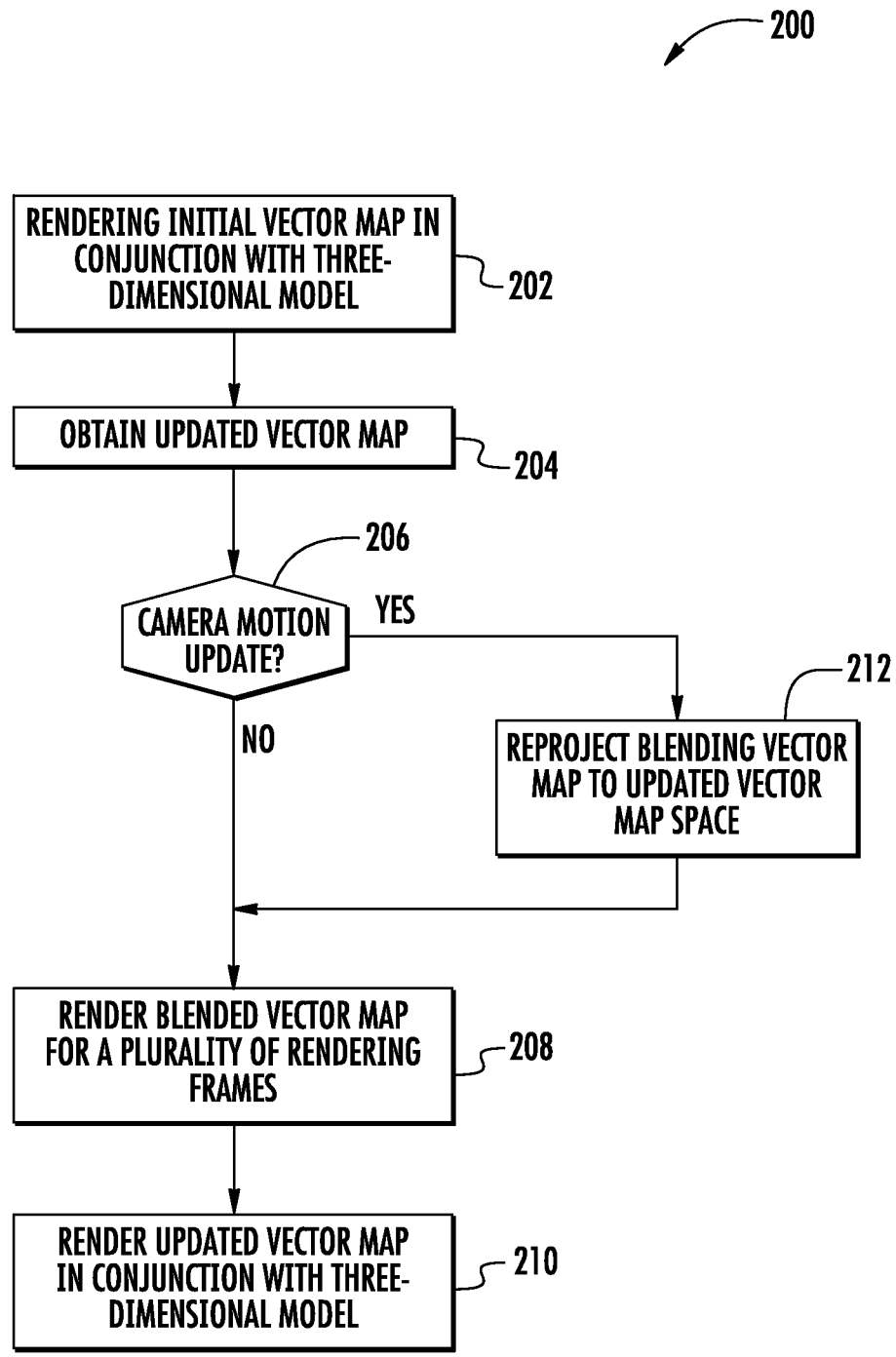
FIG. 5 depicts a flow diagram of an example method for rendering vector data according to an example embodiment of the present disclosure.

FIG. 5 depicts a flow diagram of an example method (200) for rendering vector data in conjunction with a three-dimensional model of a geographic area according to an example embodiment of the present disclosure. The method (200) can be implemented by one or more computing devices, such one or more of the computing devices depicted in FIG. 7. In addition, FIG. 5 depicts steps performed in a particular order for purposes of illustration and discussion. Those of ordinary skill in the art, using the disclosures provided herein, will understand that the steps of any of the methods discussed herein can be modified, adapted, omitted, or expanded upon in various ways.

At (202), the method includes rendering an initial vector map in conjunction with the three-dimensional model of the geographic area. For instance, an initial vector map 125 can be texture mapped to the surface of a polygon mesh modeling at least a portion of the geographic area. The initial vector map can include vector data including one or more vector elements, such as roads, road names, borders, transit lines, etc.

At (204), the method can include obtaining an updated vector map. For instance, the initial vector map 125 can be updated to the updated vector map 130. The updated vector map can be obtained as a result of fetching new vector data, for instance, from a remote computing device. The updated vector map can also be obtained as a result of navigating to a new camera view of the three-dimensional model. The updated vector map can include more or less vector elements than the initial vector map.

At (206), it is determined whether the update to the initial vector map resulted from camera motion. If the update to the initial vector map does not result from camera motion (e.g. new vector data is fetched from a remote computing device), the method proceeds to (208) where the transition to the updated vector map is accomplished by rendering a blended vector map over a plurality of rendering frames.

More particularly, the a blended vector map can be rendered for a specified number of rendering frames or for a predetermined time interval after the updated vector map is obtained. The blended vector map can provide a blend (e.g. an alpha blend) between the updated vector map and the vector map rendered in a previous rendering frame. For instance, in the first rendering frame after the updated vector map, the blended vector map can be a blend between the initial vector map and the updated vector map. In the second rendering frame after the update to the vector map, the blended vector map can be a blend between the updated vector map and the blending vector map determined in the first rendering frame. This pattern continues through a plurality of rendering frames for a blend period. Once the blend period is complete, the updated vector map can be rendered in conjunction with the three-dimensional model (210).

When the update to the initial vector map does result from camera motion, the method can additionally include reprojecting a vector map rendered in the previous rendering frame to a texture space associated with the updated vector (212). This can align the updated vector map with the blending vector map so that blending can be more appropriately accomplished between the updated vector map and the blending vector map.

Example Method of Reprojecting a Vector Map

Figure 6:
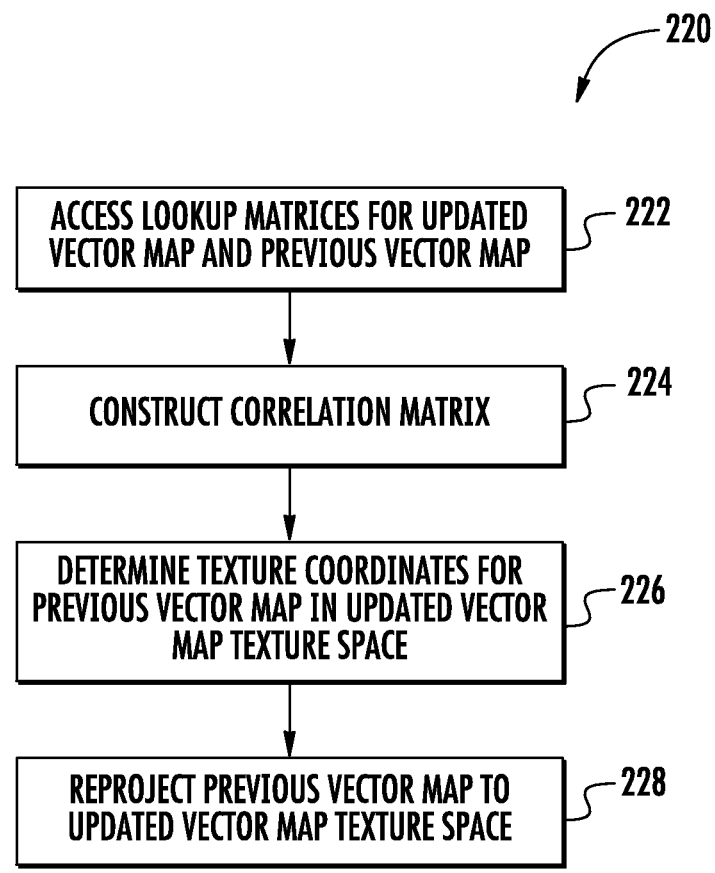
FIG. 6 depicts a flow diagram of an example method for reprojecting a vector map according to an example embodiment of the present disclosure.

FIG. 6 depicts a flow diagram of an example method (220) for reprojecting a vector map to a texture space associated with an updated vector map according to an example embodiment of the present disclosure. The method (220) can be implemented by one or more computing devices, such as one or more of the computing devices depicted in FIG. 7.

At (222) of FIG. 6, lookup matrices for the updated vector map and a vector map rendered in a previous rendering frame can be accessed. More particularly, any point in the updated vector map and the blending vector map can have associated look up matrices. For instance, the updated vector map can be associated with a look up matrix T1FromWorld. A vector map in the previous rendering frame (e.g. the initial rendering frame) can be associated with a look up matrix T2FromWorld. These lookup matrices can be derived from virtual camera parameters and can fully describe in the texture space a corresponding point on the three-dimensional model to which the point on the vector map projected.

When the updated vector map does not result from navigation of a virtual camera, the lookup matrices for the updated vector map and the vector map for the previous rendering frame can be the same. When the virtual camera is updated due to navigation of a virtual camera, the lookup matrix for the updated vector map can also change. This can make it difficult to directly blend the updated vector map with the vector map for the previous rendering frame. In particular, the updated vector map and the vector map for the previous rendering frame may not be able to be directly accumulated.

At (224), the method can include constructing a transformation matrix that associates texture coordinates in the texture space defined by the updated vector map to the texture coordinates in the texture space defined by the vector map for the previous rendering frame. For example, the transformation matrix can be constructed as follows:

$$T2FromT1 = \frac{T2FromWorld}{T1FromWorld}$$

T2fromT1 is the transformation matrix. T2FromWorld is the look up matrix associated with the vector map for the previous rendering frame. T1FromWorld is the look up matrix associated with the vector map for the updated rendering frame. The matrix division can be performed by left multiplying the inverse of T1FromWorld.

Once the transformation matrix has been constructed, texture coordinates for the vector map rendered in the previous rendering frame in the texture space associated with the updated vector map can be determined (226). In one example implementation, a full screen quad can be rendered into a temporary render buffer and in a fragment shader. Texture coordinates $(u,v,w)$ can then be determined in texture space associated with the updated vector map based on the full screen quad. More particularly, determining the texture coordinates $(u,v)$ in the texture space associated with the updated vector map can be simple based on the full screen quad. For instance $(0,0)$ can be the lower left of the full screen quad and $(1,1)$ can be the upper right of the full screen quad. The depth coordinate w in the texture space associated with the updated vector map, however, can have to be solved. The depth coordinate w can be solved based on the following equality:

$$(T1FromWorld*(u,v,w)) \cdot w = 0$$

The above equality can be established, for instance, by rendering the vector map flat on the seal level where sea level is represented by w=0. The .w component of the equality can be solved in the fragment shader.

Once the texture coordinates in the texture space associated with the updated vector map texture space have been constructed, the vector map for the previous rendering frame can be reprojected to the texture space for the updated by using the transformation matrix (228). For instance, the vector map for the previous rendering frame can be reprojected by T2FromT1*(u,v,w).

The look up matrix for the vector map for the previous rendering frame can then be set equal to the look up matrix for the updated vector map as the views represented by both the updated vector map and the vector map for the previous rendering frame are now the same. A blended vector map can then be rendered between the updated vector map and the vector map for the previous rendering frame as discussed above.

Example Computing Environments for Rendering Vector Data

Figure 7:
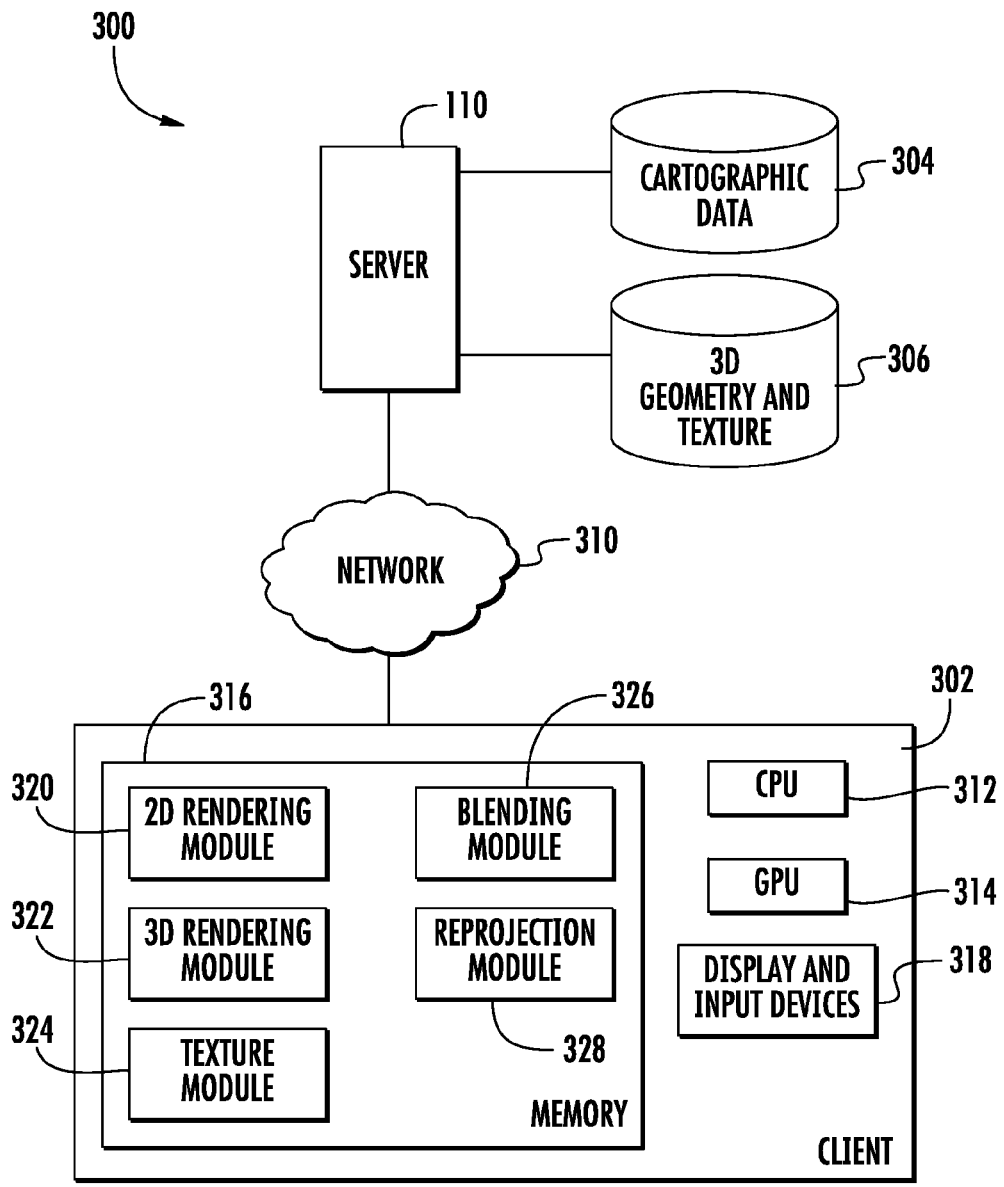
FIG. 7 depicts an example computer-based system according to an example embodiment of the present disclosure.

FIG. 7 depicts one example embodiment of a computer-based image rendering system 300 in which aspects of the present disclosure can be implemented. A client device 302 is coupled to a vector data database 304 and a three dimensional geometry and textures database 306 via a server 308. Although the databases 304 and 306 are separate in the system 300, the vector data and the three dimensional data (made up of geometry and textures) in general can be stored in one or several separate databases. The vector data and the three dimensional data can be provided to the databases 304 and 306 by the same or different sources, providers, individual users, etc.

According to some implementations, vector data in the database 304 describes shapes, line thickness, fill colors, text labels, and other attributes of vector elements. For example, the vector elements may be generated in a vector graphics format that specifies various geometric shapes (e.g., using mathematical descriptions of points and paths connecting the points) and indicates how the geometric shapes should be positioned for rendering the various vector elements. Other suitable formats can be used for the vector data.

In some instances, the three-dimensional data in the database 306 can be generated using automated techniques such as scanning or synthesis (e.g., using structure-from-motion (SFM) or another suitable three-dimensional geometry reconstruction technique) and/or manual modeling. As discussed above, the three-dimensional map data includes three-dimensional geometry (e.g. a polygon mesh) and textures that can be applied to the three-dimensional geometry.

A server 308 is coupled to the databases 304, 306 via a network 310. The network 310 can include one or more of a wide area network (WAN) such as the Internet, a local area network (LAN), a cellular network, or any other suitable type of a network. To provide data to the client device 302, the server 308 can generate electronic messages including the data and transmit these messages via the network 310.

The client device 302 can be any suitable computing device, such as a laptop, desktop, smartphone, tablet, mobile device, or other computing device. The client device 302 can be coupled to the network 310 via a wired or wireless communication protocol. The client device 302 can include one or more central processing units (CPUs) 312, one or more graphics cards or graphics processing units (GPUs) 314 dedicated to efficiently rendering images, and a memory 316, which can include volatile (e.g., RAM) and/or nonvolatile (e.g., flash) components. The CPU 312 and/or GPU 314 can configured to execute computer-readable instructions of various modules stored in the memory 316.

More specifically, the memory 316 store instructions for implementing a 2D rendering module 320, a 3D rendering module 322, a texture module 324, a blending module 326, and a reprojection module 328, each of which can be made up of instructions in one or several programming languages or other logic. It will be appreciated that the term "module" refers to computer logic utilized to provide desired functionality. Thus, a module can be implemented in hardware, firmware, application specific circuits, and/or software controlling a processor. In one embodiment, the modules are program code files stored on the storage device, loaded into memory and executed by a processor or can be provided from computer program products, for example computer executable instructions, that are stored in a tangible computer-readable storage medium such as RAM, ROM, hard disk or optical or magnetic media.

Depending on the implementation, the instructions of the modules can be compiled for execution directly on the CPU 312 or interpretable at runtime by another software application such as a web browser or a dedicated mapping application. Further, in some implementations, some or all of the modules can include graphics programs called shaders. For example, shaders can operate in an Open Graphics Library (OpenGL) pipeline and can directly access the GPU 314 to utilize its large computational power to achieve visually rich rendering with interactive performance. In addition to OpenGL, shaders can operate in other graphics frameworks such as Direct3D, for example. Moreover, in some systems, shaders can run entirely on the CPU 312.

In operation, the 2D rendering module 320 can be configured to generate textures for application to three dimensional geometry using the vector data. The 3D rendering module 322 can be configured to render the three-dimensional model including a three-dimensional mesh modeling at least a portion of a geographic area. The texture application engine can apply the vector maps to the surface of the three-dimensional model. The blending module 326 can be configured to blend an updated vector map according to example aspects of the present disclosure to provide a smooth transition between an initial vector map and an updated vector map. The reprojection module 328 can be configured to reproject a blended vector map according to example aspects of the present disclosure when the initial vector map is updated as a result of camera motion.

When executed on by the CPU 312 and/or GPU 314, graphical content is output via a user interface that includes one or more display screens and/or input devices 318. The devices 318 can include one or more of a screen, a touchscreen, a keyboard, a mouse, etc.

FIG. 3 depicts one example configuration of a computer-based system 300 that can be used to implement one or more aspects of the present disclosure. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for rendering vector data in conjunction with a three-dimensional model, comprising:

rendering, by one or more computing devices, a first vector map in conjunction with a three-dimensional model, the first vector map being texture mapped to the three-dimensional model, the first vector map including one or more vector elements;

obtaining, by the one or more computing devices, a second vector map including one or more vector elements that are different from the one or more vector elements in the first vector map; and rendering, by the one or more computing devices, a blended vector map in conjunction with the three-dimensional model during a blending period to provide a transition to the second vector map;

rendering, by the one or more computing devices, the second vector map at the end of the blending period;

wherein rendering, by the one or more computing devices, a blended vector map in conjunction with the three-dimensional model during a blending period comprises reprojecting, by the one or more computing devices, a vector map rendered in a previous rendering frame to a texture space associated with the second vector map.

2. The computer-implemented method of claim 1, wherein the transition comprises fading in of one or more vector elements associated with the second vector map.

3. The computer-implemented method of claim 1, wherein the transition comprises fading out of one or more vector elements associated with the first vector map.

4. The computer-implemented method of claim 1, wherein for each of a plurality of rendering frames during the blending period, the blended vector map comprises a blend between the second vector map and a vector map rendered during a previous rendering frame.

5. The computer-implemented method of claim 4, wherein the vector map rendered in the previous rendering frame is the first vector map.

6. The computer-implemented method of claim 4, wherein for each of the plurality of rendering frames during the blending period, the blended vector map comprises a blend between the second vector map and the vector map rendered in the previous frame determined according to the following:

$$T2_{Current\ Frame} = alpha * T1_{Updated} + (1-alpha) * T2_{Previous\ Frame}$$

wherein $T2_{Current\ Frame}$ is the blended vector map for the rendering frame, $T1_{Updated}$ is the second vector map, $T2_{Previous\ Frame}$ is the vector map for the previous rendering frame, and alpha specifies the transparency of $T1_{updated}$ and $T2_{Previous\ Frame}$.

7. The computer-implemented method of claim 1, wherein obtaining, by the one or more computing devices, the second vector map results from receiving, by the one or more computing devices, new vector data from a remote computing device.

8. The computer-implemented method of claim 1, wherein obtaining, by the one or more computing devices, the second vector map results from navigating, by the one or more computing devices, to a different view of the three-dimensional model.

9. The computer-implemented method of claim 1, wherein reprojecting, by the one or computing devices, a vector map rendered in a previous rendering frame to the texture space associated with the second vector map comprises generating, by the one or more computing devices, a transformation matrix mapping texture coordinates from a texture space associated with the vector map rendered in the previous rendering frame to the texture space associated with the second vector map.

10. A computing system, comprising:
one or more processors; and
one or more computer-readable media, the one or more computer-readable media storing computer-readable instructions that when executed by the one or more processors, cause the one or more processors to perform operations, the operations comprising:

rendering an initial vector map in conjunction with the three-dimensional model, the initial vector map being texture mapped to the three-dimensional model, the initial vector map including one or more vector elements;

obtaining an updated vector map including one or more vector elements that are different from the one or more vector elements in the initial vector map; and rendering a blended vector map in conjunction with the three-dimensional model during a blending period to accomplish fading in of one or more of the vector elements of the updated vector map;

wherein for each of a plurality of rendering frames during the blending period, the blended vector map comprises a blend between the updated vector map and a vector map rendered during a previous rendering frame;

wherein obtaining the updated vector map results from navigating to a different view of the three-dimensional model; and wherein the operation of rendering a blended vector map in conjunction with the three-dimensional model comprises reprojecting the vector map rendered in the previous rendering frame to a texture space associated with the updated vector map.

11. The computing system of claim 10, wherein the operation of reprojecting the vector map rendered in a previous rendering frame to the texture space associated with the updated vector map comprises generating a transformation matrix mapping texture coordinates from a texture space associated with the vector map rendered in the previous rendering frame to the texture space associated with the updated vector map.

12. A computer program product comprising one or more tangible non-transitory computer-readable media storing computer-readable instructions that when executed by one or more processors cause the one or more processors to perform operations, the operations comprising:

rendering an initial vector map in conjunction with the three-dimensional model, the initial vector map being texture mapped to the three-dimensional model, the initial vector map including one or more vector elements;

obtaining an updated vector map including one or more cartographic elements that are different from the one or more vector elements in the initial vector map; and rendering a blended vector map in conjunction with the three-dimensional model during a blending period to accomplish fading in of the updated vector map and fading out of the initial vector map;

wherein for each of a plurality of rendering frames during the blending period, the blended vector map comprises a blend between the updated vector map and a vector map rendered during a previous rendering frame;

wherein obtaining the updated vector map results from navigating to a different view of the three-dimensional model;

wherein the operation of rendering a blended vector map in conjunction with the three-dimensional model comprises reprojecting the vector map rendered in the previous rendering frame to a texture space associated with the updated vector map.

* * * * *